US012235775B2

(12) United States Patent
Peterson et al.

(10) Patent No.: US 12,235,775 B2
(45) Date of Patent: Feb. 25, 2025

(54) USING A TRANSIENT CACHE LIST AND PROLONGED CACHE LIST TO MANAGE TRACKS IN CACHE BASED ON A DEMOTION HINT WITH A TRACK ACCESS REQUEST

(71) Applicant: INTERNATIONAL BUSINESS MACHINES CORPORATION, Armonk, NY (US)

(72) Inventors: Beth Ann Peterson, Tucson, AZ (US); Lokesh Mohan Gupta, Tucson, AZ (US); Kyler A. Anderson, Sahuarita, AZ (US); Mark A. Lehrer, Poughkeepsie, NY (US); Christopher Daniel Filachek, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 18/179,901

(22) Filed: Mar. 7, 2023

(65) Prior Publication Data
US 2024/0303206 A1 Sep. 12, 2024

(51) Int. Cl.
*G06F 12/121* (2016.01)
*G06F 12/14* (2006.01)
(52) U.S. Cl.
CPC ........ *G06F 12/1483* (2013.01); *G06F 12/121* (2013.01); *G06F 2212/1021* (2013.01)

(58) Field of Classification Search
CPC ......... G06F 12/1483; G06F 2212/1021; G06F 12/121
See application file for complete search history.

(56) References Cited

U.S. PATENT DOCUMENTS

| 10,564,972 | B1 | 2/2020 | Doshi et al. |
| 11,061,828 | B1 | 7/2021 | Peterson et al. |
| 2005/0251628 | A1* | 11/2005 | Jarvis ................. G06F 12/0804 711/E12.04 |

(Continued)

OTHER PUBLICATIONS

"Method and Mechanism for Reducing Cache Pollution of Page Checksum", IP.com, Mar. 28, 2009, IP.com No. IPCOM000180846D, 5 pp.

(Continued)

*Primary Examiner* — Eric T Loonan
(74) *Attorney, Agent, or Firm* — KONRAD, RAYNES, DAVDA & VICTOR LLP; David W. Victor

(57) ABSTRACT

Provided are a computer program product, system, and method for using a transient cache list and prolonged cache list to manage tracks in cache based on a demotion hint with a track access request. A track is staged into the cache in response to a request for the track. A determination is made as to whether the request provides a demotion hint. The track is indicated in a transient cache list in response to determining that the request provides the demotion hint. The track is indicated in a prolonged cache list in response to determining that the request does not provide the demotion hint. The track is demoted from the cache in response to the request for the track comprising a read request, returning the track to the read request, and the track is indicated in the transient cache list.

19 Claims, 7 Drawing Sheets

(56) References Cited

U.S. PATENT DOCUMENTS

| | | | |
|---|---|---|---|
| 2011/0191545 A1* | 8/2011 | Miller | G06F 9/3004 |
| | | | 711/141 |
| 2018/0150402 A1* | 5/2018 | Ash | G06F 12/0893 |
| 2018/0275884 A1* | 9/2018 | Riedy | G06F 12/0868 |
| 2021/0208791 A1* | 7/2021 | Peterson | G06F 3/061 |

OTHER PUBLICATIONS

"Caching of Long Transaction History for Optimized Rollback Performance", IP.com, Aug. 15, 2012, IP.com No. IPCOM000220914D, 4 pp.

"A Method and System for Enabling Concurrent Access and Replacement of Cache Entries Within the Same Congruence Class in an N-Way Set Associative Cache", IP.com, Aug. 27, 2014, IP.com No. IPCOM000238477D, 5 pp.

N.S. Karkala, et al., "Improving Cache Performance by Mitigating Last Level Cache Pollution", Project Report, Spring Quarter 2014, 19 pp.

D.T. Paul, "Reducing Cache Pollution in Time-Shared Systems", Department of Electrical Engineering and Computer Science, Jan. 19, 2001, 76 pp.

V. Seshadri, et al., "Mitigating Prefetcher-Caused Pollution Using Informed Caching Policies for Prefetched Blocks", ACM Transactions on Architecture and Code Optimization, vol. 11, Article 51, Jan. 2015, 22 pp.

Y. Huang, et al., "Reducing Cache Pollution of Threaded Pre-Fetching by Controlling Prefetch Distance", 2012 IEEE 26th International Parallel and Distributed Processing Symposium Workshops & PhD Forum, 2012, 9 pp.

U.S. Appl. No. 18/179,940, filed Mar. 7, 2023.

List of IBM Patents or Patent Applications Treated as Related, 2 pp., dated Mar. 7, 2023.

\* cited by examiner

USING A TRANSIENT CACHE LIST AND PROLONGED CACHE LIST TO MANAGE TRACKS IN CACHE BASED ON A DEMOTION HINT WITH A TRACK ACCESS REQUEST

BACKGROUND OF THE INVENTION

1. Field of the Invention

The present invention relates to a computer program product, system, and method for using a transient cache list and prolonged cache list to manage tracks in cache based on a demotion hint with a track access request.

2. Description of the Related Art

A cache management system in a storage controller buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. A cache hit occurs when requested data is available in cache and may be immediately returned to the read request. A cache miss occurs when the data needs to be staged from storage into the cache for a read request. Large amounts of cache misses can degrade Input/Output ("I/O") performance by increasing the rate at which tracks have to be staged from storage to cache instead of returning data to read requests directly from the faster access cache.

Read intensive utilities may read billions of records and tracks as part of normal operations. Some read intensive processes may read all records in a database or volume. Staging data from storage to cache for such read intensive processes may evict frequently accessed tracks from cache to free space for data from these read intensive operations.

There is a need in the art for improved techniques to manage tracks in cache to retain frequently accessed tracks in cache.

SUMMARY

Provided are a computer program product, system, and method for using a transient cache list and prolonged cache list to manage tracks in cache based on a demotion hint with a track access request. A track is staged into the cache in response to a request for the track. A determination is made as to whether the request provides a demotion hint. The track is indicated in a transient cache list in response to determining that the request provides the demotion hint. The track is indicated in a prolonged cache list in response to determining that the request does not provide the demotion hint. The track is demoted from the cache in response to the request for the track comprising a read request, returning the track to the read request, and the track is indicated in the transient cache list.

DETAILED DESCRIPTION

Read intensive utilities involve reads of billions of records that require the records to pass through cache before being returned to the host initiating these read intensive operations. Tracks staged into cache for such read intensive processes are unlikely to be re-accessed. However, the tracks staged into cache for these read intensive processes evict from cache frequently accessed tracks to free space for the read intensive tracks. Because tracks are evicted having a greater likelihood of frequent access in favor of tracks likely to be read only once, such read intensive processes degrade cache performance by polluting cache with tracks intended to be read only once.

Described embodiments provide improvements to computer technology for managing tracks in cache by maintaining two cache lists, a transient cache list and prolonged cache list to manage tracks in cache. The transient cache list is intended to indicate tracks in cache that are likely to be read just once and thus do not need to remain in cache beyond the time to return to the read intensive operation. The prolonged cache list may maintain tracks in cache due to transactional workload, where a cached track is more likely to be frequently accessed and, thus, a preferred candidate to remain in cache.

Described embodiments demote tracks from the transient cache list at a much higher rate than tracks are demoted from the prolonged cache list to ensure that frequently accessed tracks, indicated on the prolonged list, remain in cache longer than tracks not likely to be accessed again, which are indicated on the transient cache list.

Described embodiments further provide improvements to computer technology for host side operations by having the host determine whether to send a demotion hint to the storage controller to cause the storage controller to manage the accessed track in the transient cache list, where it will be demoted at a higher rate than cached tracks indicated in the prolonged list.

Figure 1:
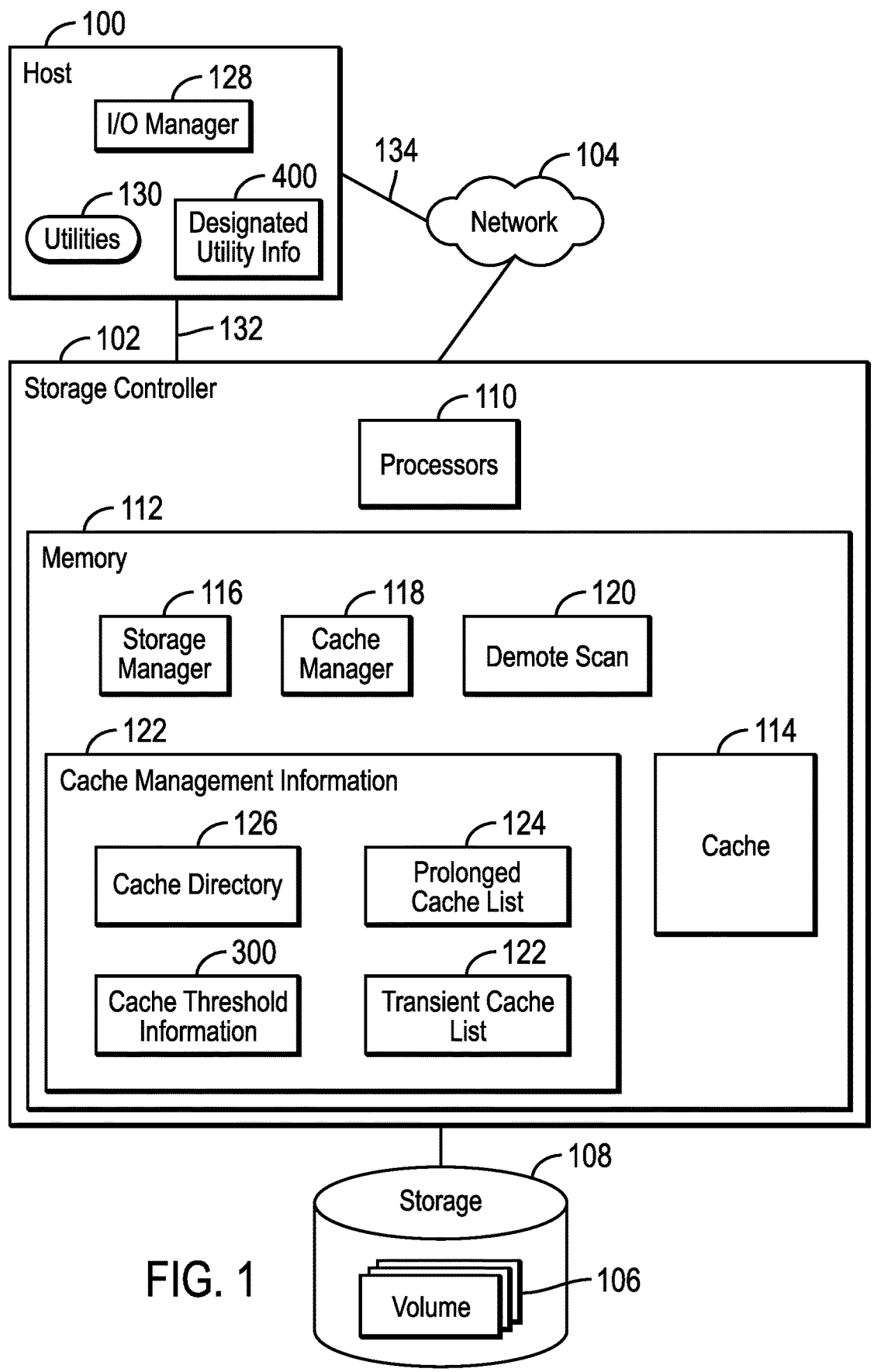
FIG. 1 illustrates an embodiment of a computing environment.

FIG. 1 illustrates an embodiment of a computing environment. A host 100, which may be one of a plurality of similar hosts, may submit Input/Output (I/O) requests to a storage controller 102 over a network 104 to access data at volumes 106 (e.g., Logical Unit Numbers, Logical Devices, Logical Subsystems, etc.) in a storage 108. The storage controller 102 includes one or more processors 110 and a memory 112, including a cache 114 to cache data for the storage 108. The processors 110 may comprise a separate central processing unit (CPU), one or a group of multiple cores on a single CPU, or a group of processing resources on one or more CPUs. The cache 114 buffers data transferred between the host 100 and volumes 106 in the storage 108.

The memory 112 further includes a storage manager 116 to manage the transfer of tracks between the host 100 and the storage 108; a cache manager 118 that manages data transferred between host 100 and the storage 108 in the cache 114; and a demotion scan 120 to demote tracks from the cache 114 based on whether cache demotion conditions are satisfied. A track may comprise any unit of data configured in the storage 108, such as a track, Logical Block Address (LBA), storage cell, group of cells (e.g., column, row or array of cells), sector, segment, etc., which may be part of a larger grouping of tracks, such as a volume, logical device, etc.

In certain implementations, the cache manager 118 maintains cache management information 122 in the memory 112 to manage read (unmodified) and write (modified) tracks in the cache 114. The cache management information 122 may include a least recently used (LRU) prolonged cache list 124 and an LRU transient cache list 122 in which to indicate tracks in the cache 114 to determine which track to demote from the cache 114; a cache directory 126 providing an index of cache control blocks $200_i$ (FIG. 2); and cache threshold information 300 having information on thresholds used to determine when to demote tracks from the transient cache list 122. In certain embodiments, there may be one cache control block $200_i$ providing metadata for each track in the cache 114. A cache control block $200_i$ may be stored in a segment of a track in the cache 114.

In certain embodiments, the cache directory 126 may be implemented as a scatter index table, where a track address or cache control block identifier is hashed to an entry in the table. If the cache 114 has data for that cache control block or track, the entry in the cache directory 126 to which the value hashes, would have a pointer to a location in cache 114 where the cache control block $200_i$ segment for a track is stored.

Indicating a track in one of the lists 122 or 124 may comprise indicating the cache control block $200_i$ ID (index value) in the list 122, 124 or indicating the track identifier on the list 122, 124.

The host 100 may include an Input/Output (I/O) manager 128 to manage I/O requests submitted by utility applications 130, internal (as shown) or external to the host 100. The I/O manager 128 maintains designated utility information 400 indicating which utilities 130 should have their track access requests, e.g., read and write requests, submitted with a demotion hint used to indicate a track on the transient cache list 122, where tracks are demoted at a faster rate than tracks in the prolonged cache list 124. Further, tracks on the prolonged cache list 124 may consume a substantially larger portion of cache 114 than tracks on the transient cache list 122, which may be limited to a low percentage of cache 114, e.g., 5%. The tracks in the prolonged cache list 124 may consume multiple times more cache 114 than the transient cache list 122.

The host 100 may submit requests for tracks from utilities 130 that require read requests to have very low latency on a low latency channel 132, such as transactional workload requests. The low latency channel 132 may comprise a bus interface, such as a Peripheral Component Interconnect Express (PCIe), including a bus and a bus switch to connect one or more devices on a bus, including the processor complex 110, the memory system 112, and a bus host adaptor of the host 100 to extend the bus interface over an external bus interface cable to the storage controller 102.

The host 100 may also submit high latency requests, such as requests from utilities 130 producing read intensive requests likely to be read only once, for which demotion hints are provided, on a high latency channel 134 which may utilize a separate network 104, that provides slower access than the channel 132. Typically, read requests submitted on the low latency channel 132 require that the requested read data be in cache 114. If there is not a cache hit, then the request will have to be resubmitted on the high latency channel 134. Thus, requests on the low latency channel 132 should be for tracks having a higher likelihood to be in cache 114, such as tracks indicated in the prolonged cache list 124. Tracks that will only be read once do not need to be maintained in the cache longer, and thus can be submitted on the high latency channel 134 and maintained on the transient cache list 122.

In certain embodiments, the storage controller 102 may comprise an enterprise storage controller, such as the International Business Machines Corporation (IBM®) DS8000™ storage controller. The host 100 may comprise an enterprise host system that includes an operating system such as the IBM® Z/OS® operating system. (IBM, Z/OS and DS800 are registered trademarks of IBM throughout the world).

The storage manager 116, cache manager 118, demotion scan 120, I/O manager 128, and utilities 130 may comprise program code loaded into the memory 112 and executed by one or more of the processors 110. Alternatively, some or all of the functions may be implemented as microcode or firmware in hardware devices in the storage controller 102, such as in Application Specific Integrated Circuits (ASICs).

The storage 108 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 112 may comprise a suitable volatile or non-volatile memory devices, including those described above.

The network 104, used for the high latency channel 134, may comprise a Storage Area Network (SAN), a Local Area Network (LAN), a Wide Area Network (WAN), the Internet, and Intranet, etc. The hosts may also submit requests on the low latency cannel 132, which may comprise a bus interface, such as a Peripheral Component Interconnect (PCI) bus interface and other interfaces known in the art.

Figure 2:
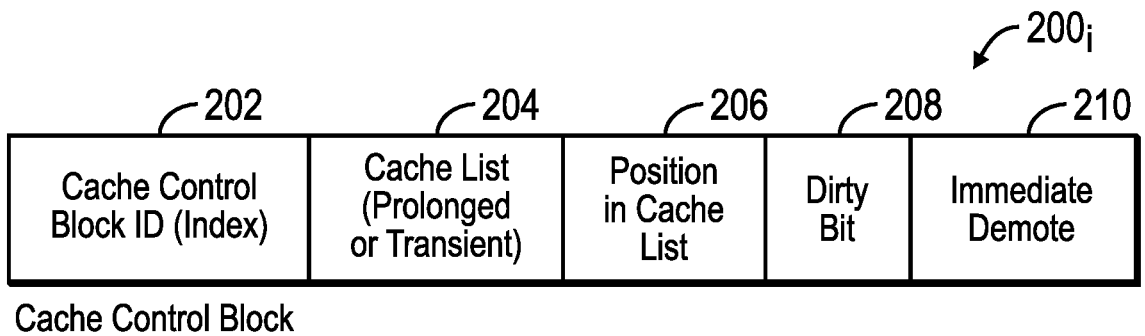
FIG. 2 illustrates an embodiment of a cache control block.

FIG. 2 illustrates an embodiment of an instance of a cache control block $200_i$ for one of the tracks in the cache 114, including, but not limited to, a cache control block identifier 202, such as an index value of the cache control block $200_i$; the cache list 204 in which the track associated cache control block $200_i$ is indicated, such as the prolonged cache list 124 or the transient cache list 122; a position in the LRU cache list 206 where the track is indicated; a dirty bit 208 indicating whether the track is modified (dirty) or unmodified; and an immediate demotion flag 210 indicating to demote a track when returning the track to a read request if the track was staged into the cache 114 for a read request submitted with an immediate demotion hint. A track may be indicated on one of the cache lists 122, 124 by indicating the cache control block ID 202 or the track ID in the lists 122, 124, which may comprise LRU lists comprising a linked list of entries.

Figure 3:
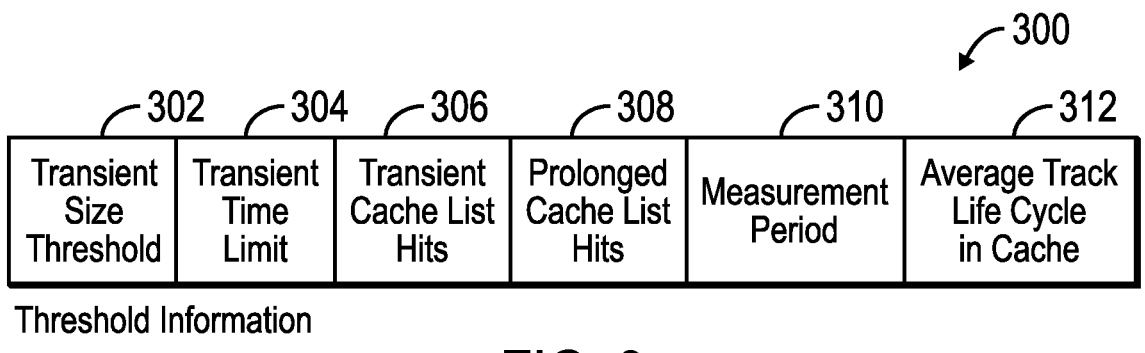
FIG. 3 illustrates an embodiment of threshold information used to determine when to demote tracks indicated in a transient track list.

FIG. 3 illustrates an embodiment of threshold information 300 maintained to determine when to demote a track in the cache 114, and may include: a transient size threshold 302 indicating to demote tracks indicated in the transient cache list 122 when a size or percentage of the tracks in cache 114 indicated in the transient cache list 122 exceeds a threshold; a transient time limit 304 indicating to demote tracks indicated in the transient cache list 122 that have a duration in cache 114 exceeding the transient time limit 304; transient cache list hits 306 indicating a number of access requests to tracks indicated in the transient cache list 122 during a measurement period 310; prolonged cache list hits 308 indicating a number of access requests to tracks indicated in the prolonged cache list 124 during the measurement period 310; and an average track life cycle in cache 312, indicating an average time each track has been in cache 114 before being demote, which may be updated when a track is demoted.

Figure 4:
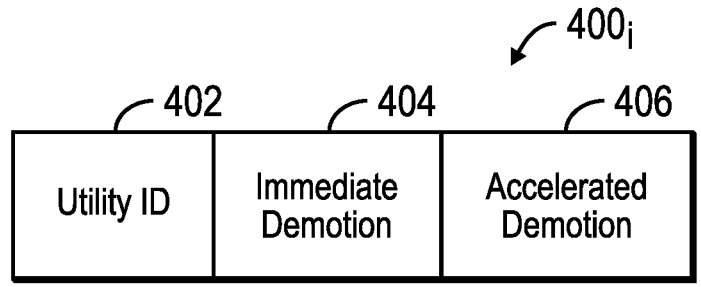
FIG. 4 illustrates an embodiment of utility information used by a host to determine whether to include a demotion hint with a track access request.

FIG. 4 illustrates an embodiment of designated utility information 400 including: a utility identifier 402 of a utility application 130 submitting access requests to the host 100, which may be internal or external to the host 100; an immediate demotion flag 404 and accelerated demotion flag 406 indicating whether read/write requests from the utility 402 should include demotion hint of immediate demotion or accelerated demotion, respectively. The demotion hint may be provided for read intensive utilities likely to request a track unlikely to be re-accessed. The immediate demotion 404 hint may be used for utilities 130 requesting tracks that are even less likely to be re-accessed than utilities 130 having the accelerated demotion 406 hint. For instance, a command that copies an entire storage volume by sequentially reading all tracks just once would have an immediate demotion flag 404 indicating to immediately remove from cache 114 after being returned to the host 100. Tracks requested with the accelerate demotion flag 406 have a higher likelihood of subsequent access than tracks requested with the immediate demotion hint.

Figure 5:
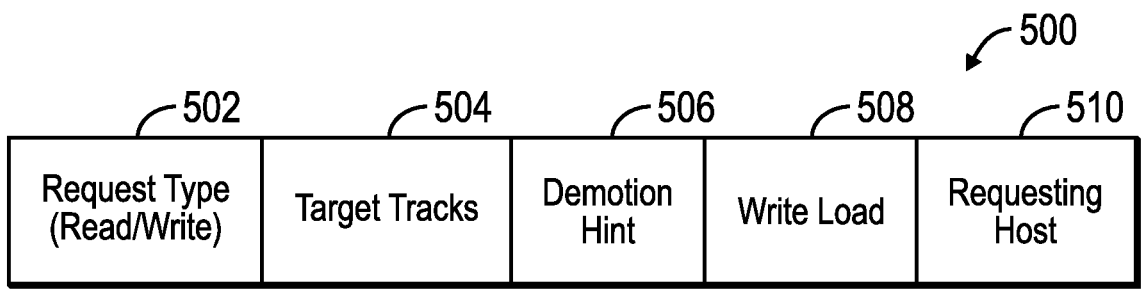
FIG. 5 illustrates an embodiment of a track access request.

FIG. 5 illustrates an embodiment of a track access request submitted by the I/O manager 128 to access (read/write) a track stored in the storage 108, and includes: a request type 502 indicating whether the request is a read or write; target tracks to access (read or write); a demotion hint 506 of immediate demotion 404 or accelerated demotion 406, or no demotion hint indicating to handle as normal transactional processing; a write load 508 if a write; and a host 510 to which to return acknowledgment.

FIG. 6 illustrates an embodiment of operations performed by the cache manager 118 to process a track access request 500. Upon receiving (at block 600) the request 500, if (at block 602) the track to access is not in cache 114, then for a read, the cache manager 118 stages (at block 604) the track from the storage to the cache 114 and, for a write, writes the received modified data into the cache 114. A cache control block $200_i$ is created (at block 606) for the track, including cache control block ID 202 and the dirty bit 208 set if the request is a write. If (at block 608) the request indicates a demotion hint 506, such as immediate demotion 404 or accelerated demotion 406, then if (at block 610) immediate demotion is indicated, the immediate demotion flag 210 is set for a read request to demote upon returning the read data to the host 100. If (at block 608) the demotion hint 506 indicates accelerated demotion, then the track is not to be immediately demoted upon returning the read data, and an index to the new cache control block $200_i$ for the read request is added (at block 614) to the most recently used (MRU) of the transient cache list 122. The index to the cache control block $200_i$ is also added (at block 614) to the transient cache list 122 (from block 612) for the immediate demotion hint. If (at block 608) the track request 500 does not provide a demotion hint 506, then an index to the cache control block $200_i$ for the target track 502 is added (at block 616) to the MRU end of the prolonged cache list 124, which indicates tracks in cache 114 many times larger than the transient cache list 122.

If (at block 602) the requested track 504 is in the track, then the cache manager 118 increments the transient cache list hits 306 or prolonged cache list hits 308 depending on whether the requested track is on the transient 122 or prolonged 124 cache list, respectively. For a write request, the write data 506 is written (at block 620) to cache 114 and the dirty bit 208 is set and, for a read, the read data is transferred from the cache 114 to the requesting host 510. Control then proceeds (at block 622) to block 624 in FIG. 6b where the cache manager 118 determines whether the request 500 indicates a demotion hint 506. If (at block 624) there is no demotion hint 506, i.e., regular transactional processing, then the track 504, or cache control block index ID 202 for the track 504, is indicated (at block 626) at the MRU end of the prolonged cache list 124 and indication of the track is removed (at block 628) from the transient cache list 122 if on the transient cache list 122 from a previous track access having the demotion hint. The immediate demotion flag 210 is cleared (at block 630).

If (at block 624) the request 500 indicates a demotion hint 506, e.g., accelerated or immediate, and if (at block 632) the hit is immediate demotion, then control ends. In this way, a track identified for immediate demotion that is already indicated in one of the cache lists 122, 124 is left in cache 114 in-place, where it is to be demoted based on its current status. If (at block 632) the hit 506 is accelerated demotion and if (at block 634) the track is on the prolonged cache list 124, then control also ends without changing the status of the track already in cache because the track is likely to be accessed again as it was not recommended for an immediate or accelerated demotion. If (at block 634) the track is on the transient cache list 122, then the track 504 is indicated on the MRU end of the transient cache list 636 to remain in the cache longer as this is accelerated demotion, not immediate demotion. The immediate demotion flag 506 is cleared (at block 638).

Figure 6A:
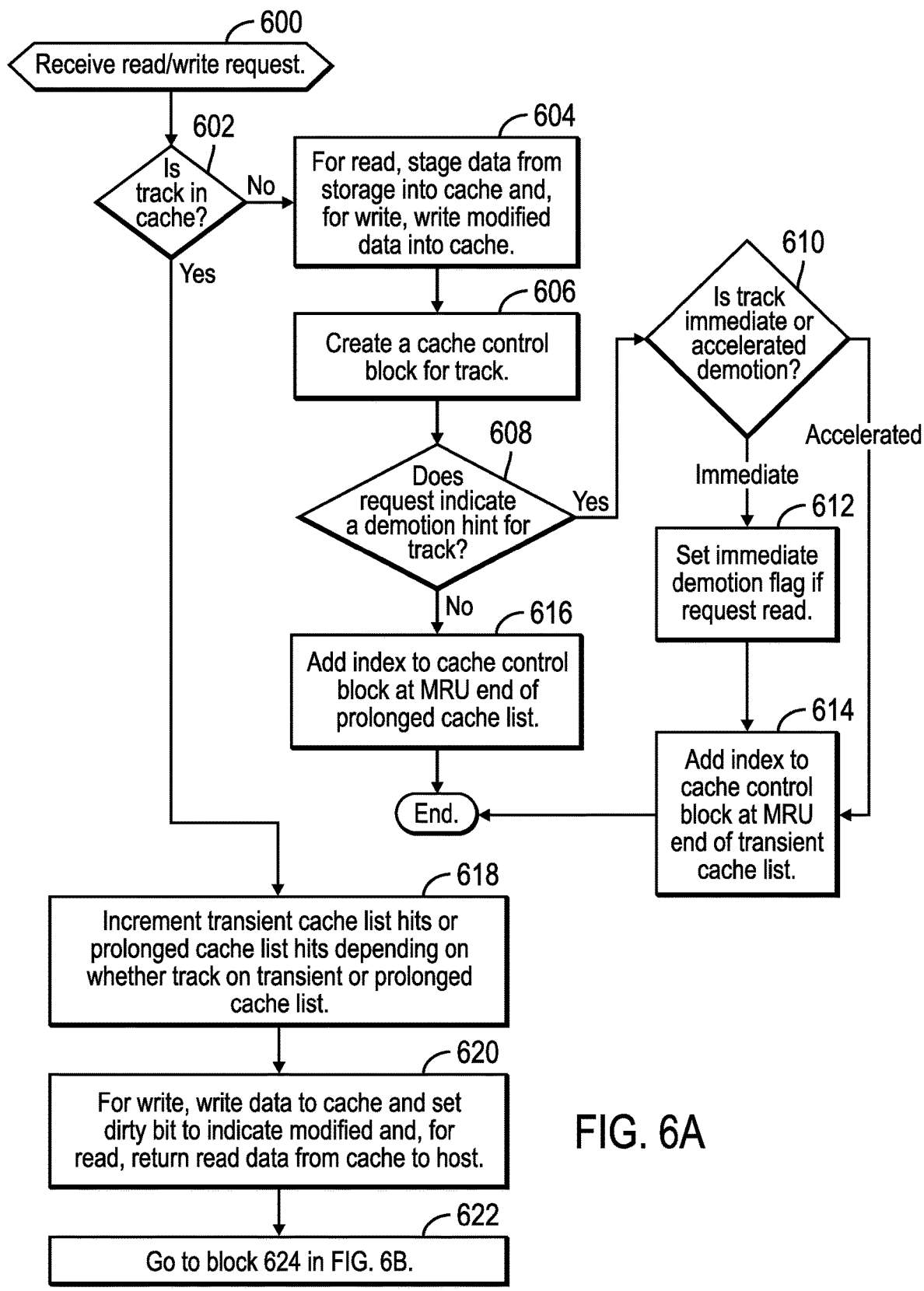
FIGS. 6a, 6b illustrates an embodiment of operations to manage a track in cache for a track access request.
Figure 6B:
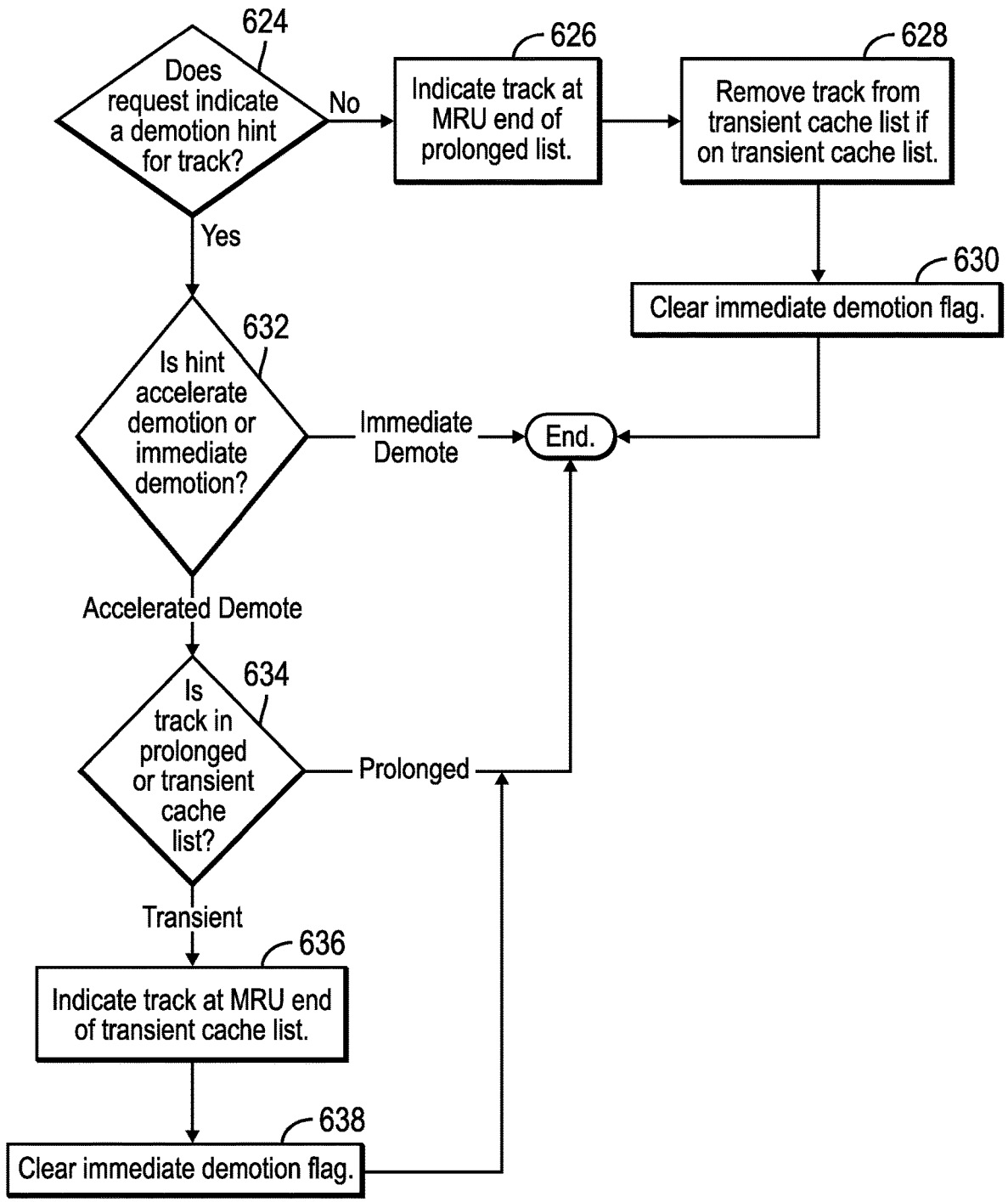

With the embodiment of FIGS. 6a and 6b, a track is placed on a prolonged cache list 124 if the track is likely to be requested again, and not part of an intensive read operation to read tracks without likely subsequent accesses. For read intensive operations to read tracks not likely to be requested again in the immediate future, as suggested by the demotion hint, the tracks are maintained in a transient cache list 122, whose tracks are limited to a much smaller portion of the cache 114 than tracks in the prolonged list 124. Further, tracks almost certain to not be subsequently accessed in the near future are indicated for immediate demotion, such as if the track was not in cache when the read was received because no other process recently requested this track because it was not in cache 114 at the time. Frequently accessed tracks from transactional workloads are indicated on a prolonged cache list 124 to maintain the tracks in cache for the longest possible time. Requests for tracks provided with a demotion hint will not cause the track indicated on the prolonged list 124 to be moved to the transient cache list 122 so as to not interfere with the transactional workload that caused that track to be added to the prolonged cache list 124.

Figure 7:
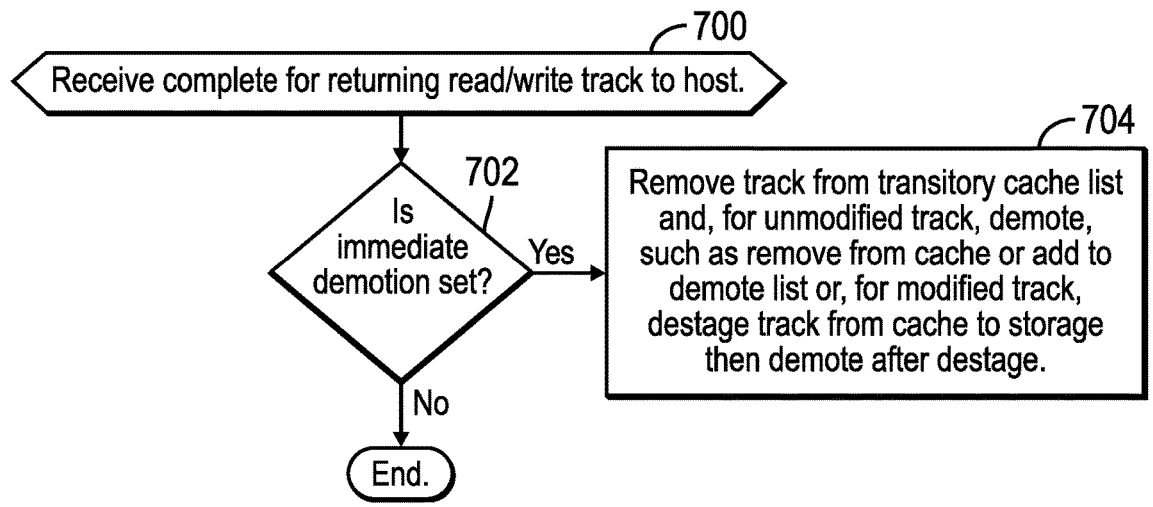
FIG. 7 illustrates an embodiment of operations to process an acknowledgment that a track has been returned to a read request.

FIG. 7 illustrates an embodiment of operations to process an acknowledgement of complete for returning a read track to the host 100. Upon receiving (at block 700) complete, if (at block 702) immediate demotion 506 is set, then the track is removed (at block 704) from the transitory cache list 122, which may be at any position in the transitory cache list 122. For unmodified data, the dirty bit 208 is not set, the track demotion involves removing the track from cache 114 or adding to a demotion list, which is later processed to remove demoted tracks from cache 114. For modified data, the dirty bit 208 is set, the track is destaged and, after destage, removed from cache 114 or added to the demotion list to demote later. If (at block 702) immediate demotion 506 is not set, then the track remains on the transient cache list 122 or prolonged list 124 until it is demoted during a regularly scheduled demote scan 120 to free space.

With the embodiment of FIG. 7, after the requested read track is returned to the host 100 from the cache 118, then if the track was specified for immediate demotion, it will be immediately demoted even if not at the LRU end of the transient cache list 122.

Figure 8:
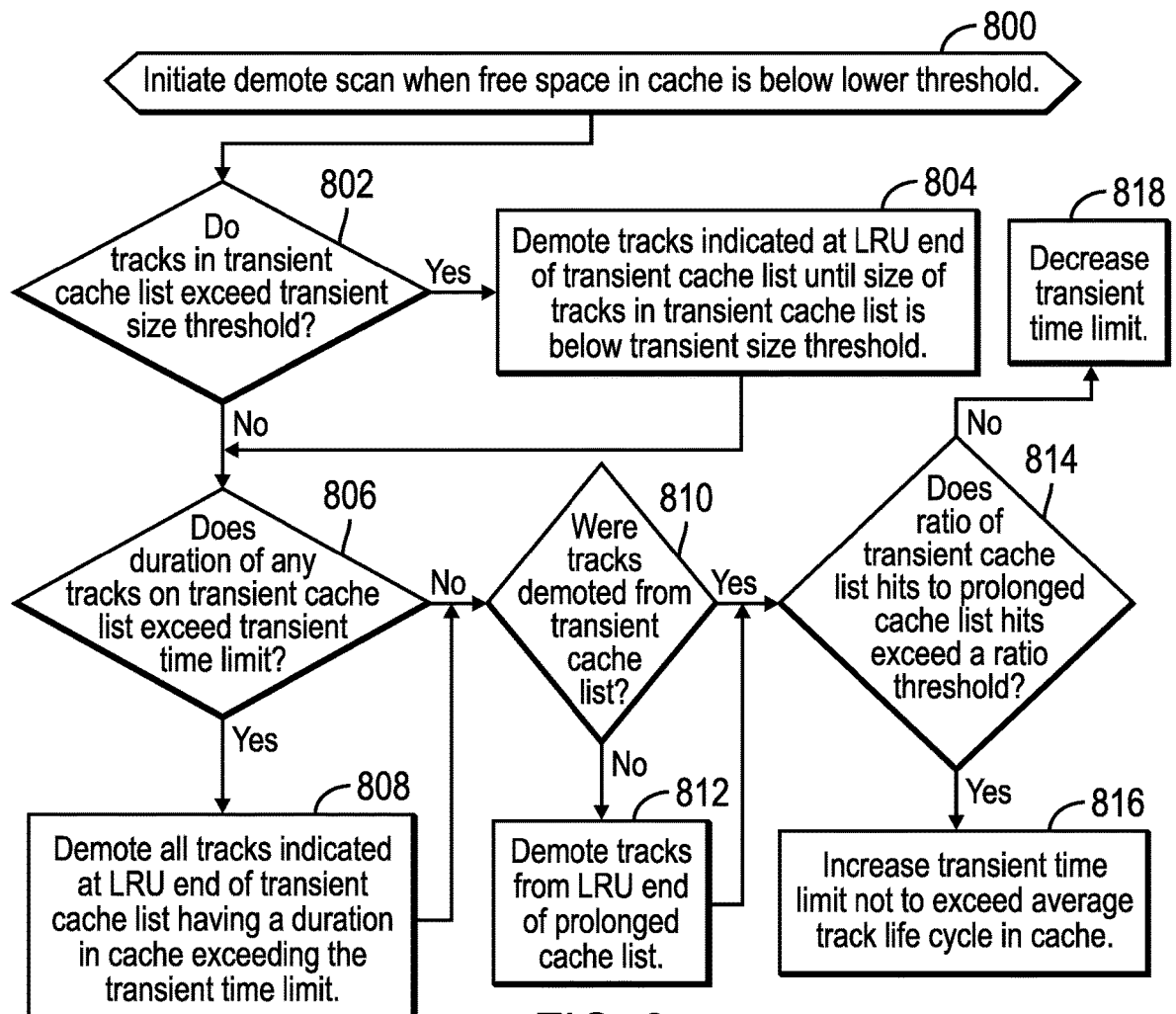
FIG. 8 illustrates an embodiment of a demote scan process to demote tracks from cache.

FIG. 8 illustrates an embodiment of operations performed by the demote scan 120 process that may be invoked when cache 114 free space falls below a lower threshold. Upon initiating a demote scan (at block 800) when free space in cache 114 falls below a lower threshold, if (at block 802) tracks in cache 114 indicated in the transient cache list 122 exceed the transient size threshold 302, then the demote scan 120 demotes (at block 804) tracks indicated at LRU end of the transient cache list 122 until the space consumed by tracks indicated in the transient cache list 122 is below the transient size threshold 302. If (at block 802) the transient size threshold 302 is not exceeded or after demoting tracks (at block 804), a determination is made (at block 806) whether the duration of any tracks on the transient cache list 122 exceed a transient time limit 304. If (at block 806) the transient time limit 304 is exceeded, then the demote scan 120 demotes (at block 808) all tracks indicated at the LRU end of the transient cache list 122 having a duration in cache 114 exceeding the transient time limit 304.

From the NO branch of block 806 or block 808, if (at block 810) tracks were not demoted from the transient cache list 122, then tracks are demoted (at block 812) from the LRU end of the prolonged cache list 124 to free space in cache 114. Tracks may be demoted from the prolonged cache list 124 to a point where the cache 114 free space falls below the lower threshold by some amount. From block 812 or the YES branch of block 810, if (at block 814) the ratio of transient cache list hits 306 and prolonged cache list hits 308 exceeds a ratio threshold, then the transient time limit 304 is increased (at block 816) not to exceed the average track life cycle in cache 312. If (at block 814) the ratio is not exceeded, then the transient time limit 304 is decreased (at block 816).

The transient time limit 304 may be initially set to half the average track life cycle in cache 312, and adjusted therefrom. The increase or decrease may be by a fixed percentage or according to a function. In one embodiment, the transient time limit 304 may be modified by multiplying the current transient time limit 304 by (the transient cache list hit ratio 306 divided by the prolonged cache list hit ratio 306). The transient time limit 304 may then be the maximum of that multiplication of the transient time limit 304 by the divided ratios and the average track life cycle in cache 312. In a yet further implementation, the transient time limit 304 may be increased or decreased based on a hit ratios at an LRU end portion of the cache lists 122, 124.

With the embodiment of FIG. 8, the demote scan 120 demotes tracks indicated in the transient cache list 122 because they have a lower likelihood of frequent access than tracks on the prolonged cache list 124. Further, the time limit used to select tracks from the transient cache list 122 to demote may be adjusted to increase or remove tracks faster if the ratio of the transient cache list hits 306 increases relative to the prolonged cache list hits 308. This situation occurs when the transient cache list 122 is being accessed at a relative faster rate, meaning tracks have to be demoted faster to limit the transient cache list 122 to a relatively smaller portion of the cache 114.

Figure 9:
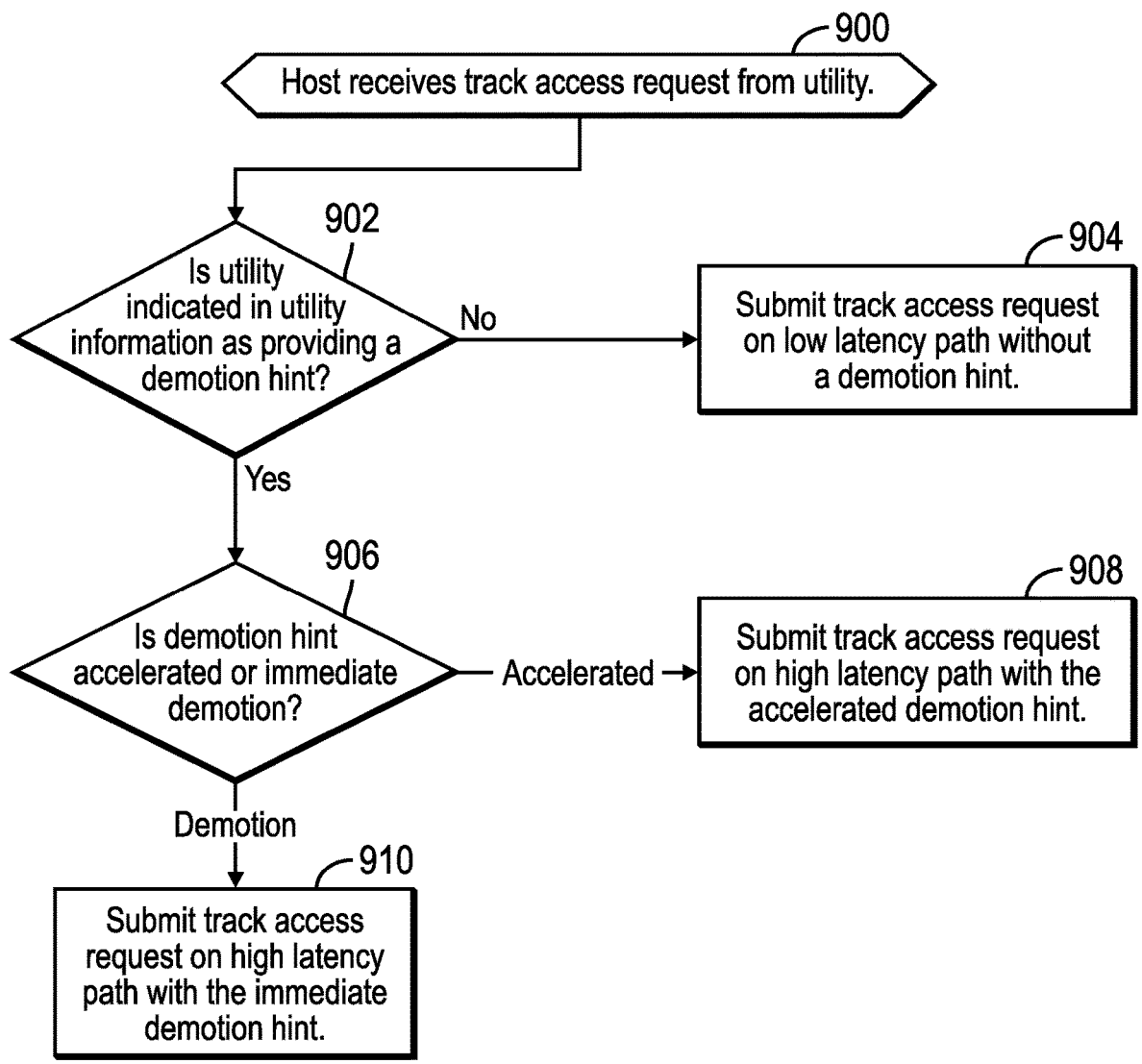
FIG. 9 illustrates an embodiment of operations for a host to include a demotion hint with a track access request.

FIG. 9 illustrates an embodiment of operations performed by the host I/O manager 128 to manage track access requests from utilities 130 running inside the host 100 or external to the host 100. Upon the host receiving (at block 900) the track access request from the utility 130, if (at block 902) the utility 130 issuing the track access request is not indicated in utility information 400$_i$ as providing a demotion hint, i.e., has a flag set for the immediate demotion 404 or accelerated demotion 406, then the I/O manager 128 submits (at block 904) a track access request 500 on the low latency channel 132 without a demotion hint 404, 406. If (at block 902) a demotion hint 404, 406 is indicated for the utility 130 in the utility information 400$_i$, then if (at block 906) the demotion hint for the utility 130 indicates accelerated demotion 406, a track access request 500 is submitted (at block 908) on the high latency path 134 with the accelerated demotion hint 506. If (at block 906) the demotion hint for the utility 130 indicates immediate demotion 404, a track access request 500 is submitted (at block 910) on the high latency path 134 with the immediate demotion hint 506.

With the embodiment of FIG. 9, the host 100 maintains demotion hint information to use for track access requests from different utilities 130 to cause the storage controller 102 to manage the track in cache 114 in different cache lists 122, 124, so that tracks indicated with a demotion hint for immediate demotion may be immediately demoted after being returned to a host read request. Tracks with some even minimal likelihood of being accessed again after a read or write request may be retained in the transient cache list 122 longer, than requests submitted with the immediate demotion hint.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation or garbage collection, but this does not render the storage device as transitory because the data is not transitory while it is stored.

Figure 10:
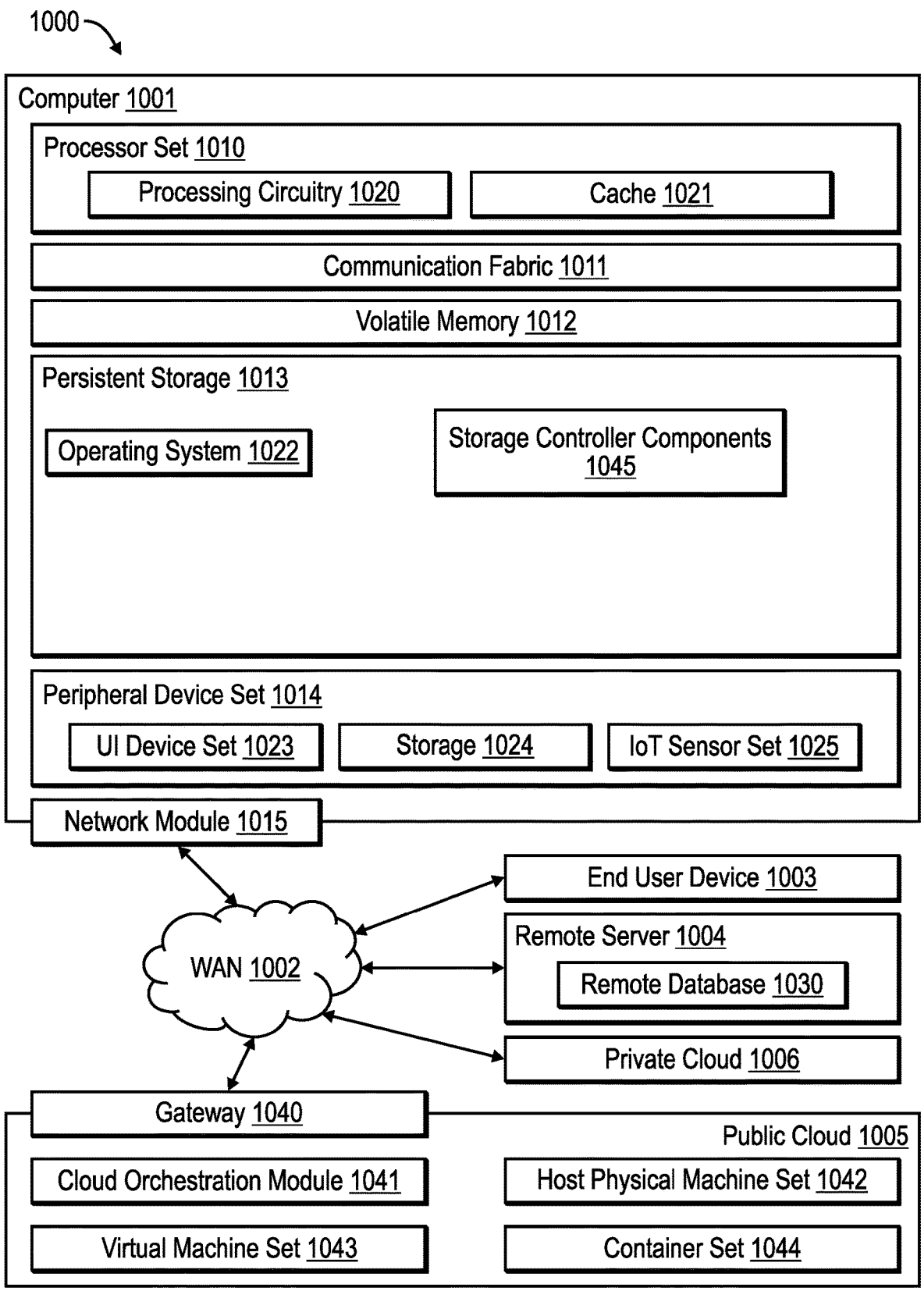
FIG. 10 illustrates a computing environment in which the components of FIG. 1 may be implemented.

In FIG. 10, computing environment 1000 contains an example of an environment for the execution of at least some of the computer code involved in performing the inventive methods, including managing tracks in cache in a transient cache list and prolonged cache list based on a demotion hint provided with a track access request, demoting tracks from the cache, and a host for submitting track access request with a demotion hint.

The computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1001, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The storage controller components 1045 include at least some of the computer code involved in performing the inventive methods, including, but not limited to, the components in the storage controller 102 comprising program components 116, 118, 120, and cache management information 122, 124, 126, 300 in FIG. 1.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future.

In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on. In certain embodiments, the EUD 1003 may comprise the host 100 in FIG. 1 and components therein.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache, the computer program product comprising a computer readable storage medium having computer readable program code embodied therein that when executed performs operations, the operations comprising:
    staging a track into the cache in response to receiving a request for the track;
    determining whether the request provides a demotion hint indicating one of immediate demotion and accelerated demotion;
    indicating the track, in the cache, in a transient cache list in response to determining that the request provides the demotion hint of one of the accelerated demotion and the immediate demotion, wherein the track in the transient cache list having the demotion hint of the accelerated demotion remains in the cache to return to a subsequent read request;
    indicating the track, in the cache, in a prolonged cache list in response to determining that the request does not provide the demotion hint; and
    removing the track from the transient cache list and demoting the track from the cache in response to receiving complete for returning the track to the request and the demotion hint of the immediate demotion was indicated for the track.

2. The computer program product of claim 1, wherein the request comprises a read request.

3. The computer program product of claim 1, wherein the request comprises a first request and the track comprises a first track, wherein the operations further comprise:
    receiving a second request for a second track in the cache;
    indicating the second track in the prolonged cache list in response to determining that the second request does not provide a demotion hint of one of the immediate demotion and the accelerated demotion; and
    removing indication of the second track from the transient cache list in response to determining that the second request does not provide the demotion hint of one of the immediate demotion and the accelerated demotion and the second track is indicated in the transient cache list.

4. The computer program product of claim 1, wherein the request comprises a first request and the track comprises a first track, wherein the operations further comprise:
    receiving a second request for a second track in the cache; and
    indicating the second track at a most recently used end of the transient cache list in response to the demotion hint indicating the accelerated demotion and the second track is indicated in the transient cache list when the second request is processed.

5. The computer program product of claim 1, wherein the request comprises a first request and the track is indicated on the prolonged cache list in response to the first request, wherein the operations further comprise:
receiving a second request for the track in the cache that was subject to the first request, wherein the track remains on the prolonged cache list in response to one of: (1) the demotion hint with the second request indicates the immediate demotion and (2) the demotion hint with the second request indicates the accelerated demotion.

6. The computer program product of claim 1, wherein the request comprises a first request and the track is indicated on one of the prolonged cache list and the transient cache list in response to the first request, wherein the operations further comprise:
receiving a second request for the track in the cache that was subject to the first request, wherein the track remains on the prolonged cache list or the transient cache list on which the track was indicated, in response to the first request, in response to one of: (1) the demotion hint with the second request indicates the immediate demotion and (2) the demotion hint with the second request indicates the accelerated demotion when the track is on the prolonged cache list.

7. The computer program product of claim 1, wherein the operations further comprise:
determining whether a demotion condition is satisfied with respect to the tracks in the transient cache list;
demoting tracks indicated in the transient cache list in response to determining that the demotion condition is satisfied; and
demoting tracks indicated in the prolonged cache list in response to determining that the demotion condition is not satisfied.

8. The computer program product of claim 7, wherein the demotion condition is satisfied in response to one of an amount of cache consumed by tracks in the transient cache list exceeding a size threshold and tracks indicated in the transient cache list having a duration in cache exceeding a time limit.

9. The computer program product of claim 7, wherein the demotion condition is satisfied in response to tracks indicated in the transient cache list having a duration in cache exceeding a time limit, further comprising:
adjusting the time limit based on a ratio of a first hit rate of the transient cache list and a second hit rate of the prolonged cache list.

10. A system for managing tracks in a storage in a cache, comprising:
a processor; and
a computer readable storage medium having computer readable program code embodied therein that when executed performs operations, the operations
staging a track into the cache in response to receiving a request for the track;
determining whether the request provides a demotion hint indicating one of immediate demotion and accelerated demotion;
indicating the track, in the cache, in a transient cache list in response to determining that the request provides the demotion hint of one of the accelerated demotion and the immediate demotion, wherein the track in the transient cache list having the demotion hint of the accelerated demotion remains in the cache to return to a subsequent read request;
indicating the track, in the cache, in a prolonged cache list in response to determining that the request does not provide the demotion hint; and
removing the track from the transient cache list and demoting the track from the cache in response to receiving complete for returning the track to the request and the demotion hint of the immediate demotion was indicated for the track.

11. The system of claim 10, wherein the request comprises a read request.

12. The system of claim 10, wherein the request comprises a first request and the track comprises a first track, wherein the operations further comprise:
receiving a second request for a second track in the cache;
indicating the second track in the prolonged cache list in response to determining that the second request does not provide the demotion hint of one of the immediate demotion and the accelerated demotion; and
removing indication of the second track from the transient cache list in response determining that the second request does not provide the demotion hint of one of the immediate demotion and the accelerated demotion and the second track is indicated in the transient cache list.

13. The system of claim 10, wherein the request comprises a first request and the track is indicated on the prolonged cache list in response to the first request, wherein the operations further comprise:
receiving a second request for the track in the cache that was subject to the first request, wherein the track remains on the prolonged cache list in response to one of: (1) the demotion hint with the second request indicates the immediate demotion and (2) the demotion hint with the second request indicates the accelerated demotion.

14. The system of claim 10, wherein the operations further comprise:
determining whether a demotion condition is satisfied with respect to the tracks in the transient cache list;
demoting tracks indicated in the transient cache list in response to determining that the demotion condition is satisfied; and
demoting tracks indicated in the prolonged cache list in response to determining that the demotion condition is not satisfied.

15. A method for managing tracks in a storage in a cache, comprising:
receiving a first request for a first track in the cache providing a demotion hint indicating immediate demotion, a second request for a second track in the cache providing a demotion hint indicating accelerated demotion, and a third request for a third track in the cache that does not provide the demotion hint;
staging the first, the second, and the third tracks into the cache;
determining whether the first, the second, and the third requests provide a demotion hint indicating one of the immediate demotion and the accelerated demotion;
in response to determining that the third request does not provide the demotion hint, indicating the third track in a prolonged cache list;
in response to determining that the first and the second requests provide the demotion hint, indicating the first and the second tracks in a transient cache list;

determining whether the demotion hint for the first and the second requests indicates the immediate demotion or the accelerated demotion;

in response to determining that the demotion hint for the first request indicates the immediate demotion, removing the first track from the transient cache list and demoting the first track from the cache in response to receiving complete for returning the first track to the first request; and in response to determining that the demotion hint for the second track indicates the accelerated demotion, maintaining the second track in the cache to return to a subsequent read request.

16. The method of claim 15, wherein the first, the second, and the third requests comprise read requests.

17. The method of claim 15, further comprising:

removing indication of the third track from the transient cache list in response determining that the second request does not provide the demotion hint and the third track is indicated in the transient cache list.

18. The method of claim 15, further comprising:

receiving a fourth request for the third track in the cache that was subject to the third request, wherein the third track remains on the prolonged cache list in response to one of: (1) the demotion hint with the fourth request indicates the immediate demotion and (2) the demotion hint with the fourth request indicates the accelerated demotion.

19. The method of claim 15, further comprising:

determining whether a demotion condition is satisfied with respect to the tracks in the transient cache list;

demoting tracks indicated in the transient cache list in response to determining that the demotion condition is satisfied; and demoting tracks indicated in the prolonged cache list in response to determining that the demotion condition is not satisfied.

* * * * *